US011036637B2

(12) United States Patent
Camp et al.

(10) Patent No.: US 11,036,637 B2
(45) Date of Patent: *Jun. 15, 2021

(54) NON-VOLATILE MEMORY CONTROLLER CACHE ARCHITECTURE WITH SUPPORT FOR SEPARATION OF DATA STREAMS

(71) Applicant: International Business Machines Corporation, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Ioannis Koltsidas, Zurich (CH); Roman Pletka, Uster (CH); Sasa Tomic, Kilchberg (CH); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/418,880

(22) Filed: May 21, 2019

(65) Prior Publication Data

US 2019/0272232 A1 Sep. 5, 2019

Related U.S. Application Data

(63) Continuation of application No. 15/683,584, filed on Aug. 22, 2017, now Pat. No. 10,387,317, which is a (Continued)

(51) Int. Cl.
*G06F 12/00* (2006.01)
*G06F 12/0855* (2016.01)
(Continued)

(52) U.S. Cl.
CPC ...... *G06F 12/0855* (2013.01); *G06F 12/0246* (2013.01); *G06F 12/0884* (2013.01);
(Continued)

(58) Field of Classification Search
None
See application file for complete search history.

(56) References Cited

U.S. PATENT DOCUMENTS 7,941,591 B2 5/2011 Aviles
8,185,778 B2 5/2012 Kilzer et al.
(Continued)

FOREIGN PATENT DOCUMENTS

CN 102609360 A 7/2012
EP 1521268 A2 4/2005
(Continued)

OTHER PUBLICATIONS

List of IBM Patents or Patent Applications Treated As Related.
(Continued)

*Primary Examiner* — Daniel D Tsui
(74) *Attorney, Agent, or Firm* — Zilka-Kotab, P.C.

(57) ABSTRACT

A computer-implemented method, according to one embodiment, includes: retrieving a physical block address corresponding to a logic block address, extracting information from the physical block address, and performing a lookup operation in cache using the extracted information. A range check of the physical block address is further performed in response to the lookup operation succeeding, while data is read from the cache in response to the range check succeeding. An architecture of the cache supports separation of data streams, as well as parallel writes to different non-volatile memory channels. The cache architecture further supports pipelining of the parallel writes to different non-volatile memory planes. Moreover, the non-volatile memory con-
(Continued)

troller is configured to perform a direct memory lookup in the cache based on a physical block address.

20 Claims, 11 Drawing Sheets

Related U.S. Application Data continuation of application No. 14/578,195, filed on Dec. 19, 2014, now Pat. No. 9,779,021.

(51) Int. Cl.
 *G06F 12/0884* (2016.01)
 *G06F 12/02* (2006.01)
(52) U.S. Cl.
 CPC ............... *G06F 2212/1016* (2013.01); *G06F 2212/1021* (2013.01); *G06F 2212/222* (2013.01); *G06F 2212/608* (2013.01); *G06F 2212/7202* (2013.01); *G06F 2212/7207* (2013.01); *G06F 2212/7208* (2013.01)

(56) References Cited

U.S. PATENT DOCUMENTS

| | | | |
|---|---|---|---|
| 8,285,918 | B2 | 10/2012 | Maheshwari |
| 8,327,110 | B2 | 12/2012 | Yamamoto |
| 8,402,242 | B2 | 3/2013 | Hu et al. |
| 8,463,983 | B2 | 6/2013 | Eleftheriou et al. |
| 8,756,375 | B2 | 6/2014 | Flynn |
| 8,838,935 | B2 | 9/2014 | Hinton et al. |
| 9,779,021 | B2 | 10/2017 | Camp et al. |
| 10,387,317 | B2 | 8/2019 | Camp et al. |
| 2004/0158675 | A1 | 8/2004 | Hirose |
| 2008/0034154 | A1 | 2/2008 | Lee et al. |
| 2009/0164724 | A1 | 6/2009 | Hirose |
| 2010/0262687 | A1 | 10/2010 | Shen et al. |
| 2011/0066788 | A1 | 3/2011 | Eleftheriou et al. |
| 2011/0087855 | A1 | 4/2011 | Frost et al. |
| 2011/0093648 | A1 | 4/2011 | Belluomini et al. |
| 2011/0213919 | A1 | 9/2011 | Frost et al. |
| 2012/0079232 | A1 | 3/2012 | Hinton et al. |
| 2012/0166709 | A1 | 6/2012 | Chun |
| 2012/0284587 | A1 | 11/2012 | Yu et al. |
| 2012/0297122 | A1 | 11/2012 | Gorobets et al. |
| 2012/0317337 | A1 | 12/2012 | Johar et al. |
| 2013/0024609 | A1 | 1/2013 | Gorobets et al. |
| 2013/0054873 | A1 | 2/2013 | Belluomini et al. |
| 2013/0061019 | A1 | 3/2013 | Fitzpatrick et al. |
| 2013/0159626 | A1 | 6/2013 | Katz et al. |
| 2013/0185526 | A1 | 7/2013 | de la Iglesia et al. |
| 2013/0205183 | A1 | 8/2013 | Fillingim et al. |
| 2013/0332668 | A1 | 12/2013 | Diep et al. |
| 2014/0068157 | A1 | 3/2014 | Makuni et al. |
| 2014/0075099 | A1 | 3/2014 | Ooneda |
| 2014/0095775 | A1 | 4/2014 | Talagala et al. |
| 2014/0223094 | A1 | 8/2014 | Baderdinni et al. |
| 2014/0304454 | A1 | 10/2014 | Ellis et al. |
| 2014/0351526 | A1 | 11/2014 | Peterson |
| 2015/0052395 | A1 | 2/2015 | Wipfel |
| 2015/0177995 | A1 | 6/2015 | Camp et al. |
| 2015/0220385 | A1 | 8/2015 | Wood et al. |
| 2016/0092352 | A1 | 3/2016 | Camp et al. |
| 2016/0170870 | A1 | 6/2016 | Camp et al. |
| 2016/0179678 | A1 | 6/2016 | Camp et al. |
| 2017/0351614 | A1 | 12/2017 | Camp et al. |

FOREIGN PATENT DOCUMENTS

| | | |
|---|---|---|
| JP | 2004185199 A | 7/2004 |
| KR | 20130048261 A | 5/2013 |
| WO | 2012148828 A2 | 11/2012 |

OTHER PUBLICATIONS

Wikipedia "Write Amplification," Wikipedia, Last Modified Jan. 21, 2014, pp. 1-13.
Camp et al., U.S. Appl. No. 14/497,243, filed Sep. 25, 2014.
Camp et al., U.S. Appl. No. 14/566,639, filed Dec. 10, 2014.
Camp et al., U.S. Appl. No. 14/578,195, filed Dec. 19, 2014.
Chung et al., "A survey of Flash Translation Layer," Journal of Systems Architecture 55, 2009, pp. 332-343.
Deng et al., "Architectures and optimization methods offlash memory based storage system," Journal of Systems Architecture 57, 2011, pp. 214-227.
Dirik et al., "The Performance of PC Solid-State Disks (SSDs) as a Function of Bandwidth, Concurrency, Device Architecture, and System Organization," ISCA'09, Jun. 20-24, 2009, pp. 279-289.
Hu et al., "Container Marking: Combining Data Placement, Garbage Collection and Wear Levelling for Flash," IBM Research, May 5, 2011, pp. 1-11.
Hu et al., "Write Amplification Analysis in Flash-Based Solid State Drives," SYSTOR'09, May 4-6, 2009, pp. 1-9.
Hu et al., "The Fundamental Limit of Flash Random Write Performance: Understanding, Analysis and Performance Modelling," IBM Research, Mar. 31, 2010, pp. 1-15.
Menon, "A performance Comparison of RAID-5 and Log-Structured Arrays," in Proceedings of the 4th IEEE International Symposium on High Performance Distributed Computing, 1995, pp. 167-178.
Min, C. et al., "SFS: random write considered harmful in solid state drives," FAST'12 Proceedings of the 10th USENIX conference on File and Storage Technologies, Feb. 14, 2012, pp. 1-16.
Patterson et al., "A Case for Redundant Arrays of Inexpensive Disks (RAID)," Proceedings of the 1988 ACM SIGMOD International Conference on Management of Data, Jun. 1988, pp. 3-14.
Ramachandran, et al., "Dynamic Data Fusion for Future Sensor Networks," ACM Transactions on Sensor Networks (TOSN), No. 3, 2006, pp. 404-443.
Anonymous, "Method for better performance by smart garbage collector invocation on SSD in high reliability environment," ip.com, No. 000223784, Nov. 29, 2012, pp. 1-6.
Rodeh, O. et al., "Visualizing Block IO Workloads," IBM Research Report, Oct. 18, 2013, pp. 1-28.
Camp et. al., U.S. Appl. No. 14/139,925, filed Dec. 24, 2013.
Ioannou et al., U.S. Appl. No. 14/866,315, filed Sep. 25, 2015.
Non-Final Office Action from U.S. Appl. No. 14/578,195, dated Jun. 16, 2016.
Non-Final Office Action from U.S. Appl. No. 14/497,243, dated Jun. 21, 2016.
Non-Final Office Action from U.S. Appl. No. 14/566,639, dated Jul. 1, 2016.
Non-Final Office Action from U.S. Appl. No. 14/578,195, dated Dec. 15, 2016.
Notice of Allowance from U.S. Appl. No. 14/578,195, dated May 26, 2017.
Camp et al., U.S. Appl. No. 15/683,584, filed Aug. 22, 2017.
Non-Final Office Action from U.S. Appl. No. 15/683,584, dated Sep. 7, 2018.
Final Office Action from U.S. Appl. No. 15/683,584, dated Feb. 21, 2019.
Notice of Allowance from U.S. Appl. No. 15/683,584, dated Apr. 4, 2019.

NON-VOLATILE MEMORY CONTROLLER CACHE ARCHITECTURE WITH SUPPORT FOR SEPARATION OF DATA STREAMS

BACKGROUND

The present invention relates to non-volatile memory, such as NAND Flash memory, and more specifically, this invention relates to a cache architecture for non-volatile memory controllers supporting the separation of data streams.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

BRIEF SUMMARY

A computer-implemented method, according to one embodiment, includes: retrieving a physical block address corresponding to a logic block address, extracting information from the physical block address, and performing a lookup operation in cache using the extracted information. A range check of the physical block address is further performed in response to the lookup operation succeeding, while data is read from the cache in response to the range check succeeding. An architecture of the cache supports separation of data streams, as well as parallel writes to different non-volatile memory channels. The cache architecture further supports pipelining of the parallel writes to different non-volatile memory planes. Moreover, the non-volatile memory controller is configured to perform a direct memory lookup in the cache based on a physical block address.

A computer-implemented method, according to another embodiment, includes: performing a direct memory lookup in cache based on a physical block address. Performing the direct memory lookup in cache includes: receiving a physical block address corresponding to a logic block address, and extracting information from the physical block address. Moreover, a lookup operation is performed in cache using the extracted information.

A computer program product, according to yet another embodiment, includes a computer readable storage medium having program instructions embodied therewith. The program instructions readable and/or executable by a controller to cause the controller to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
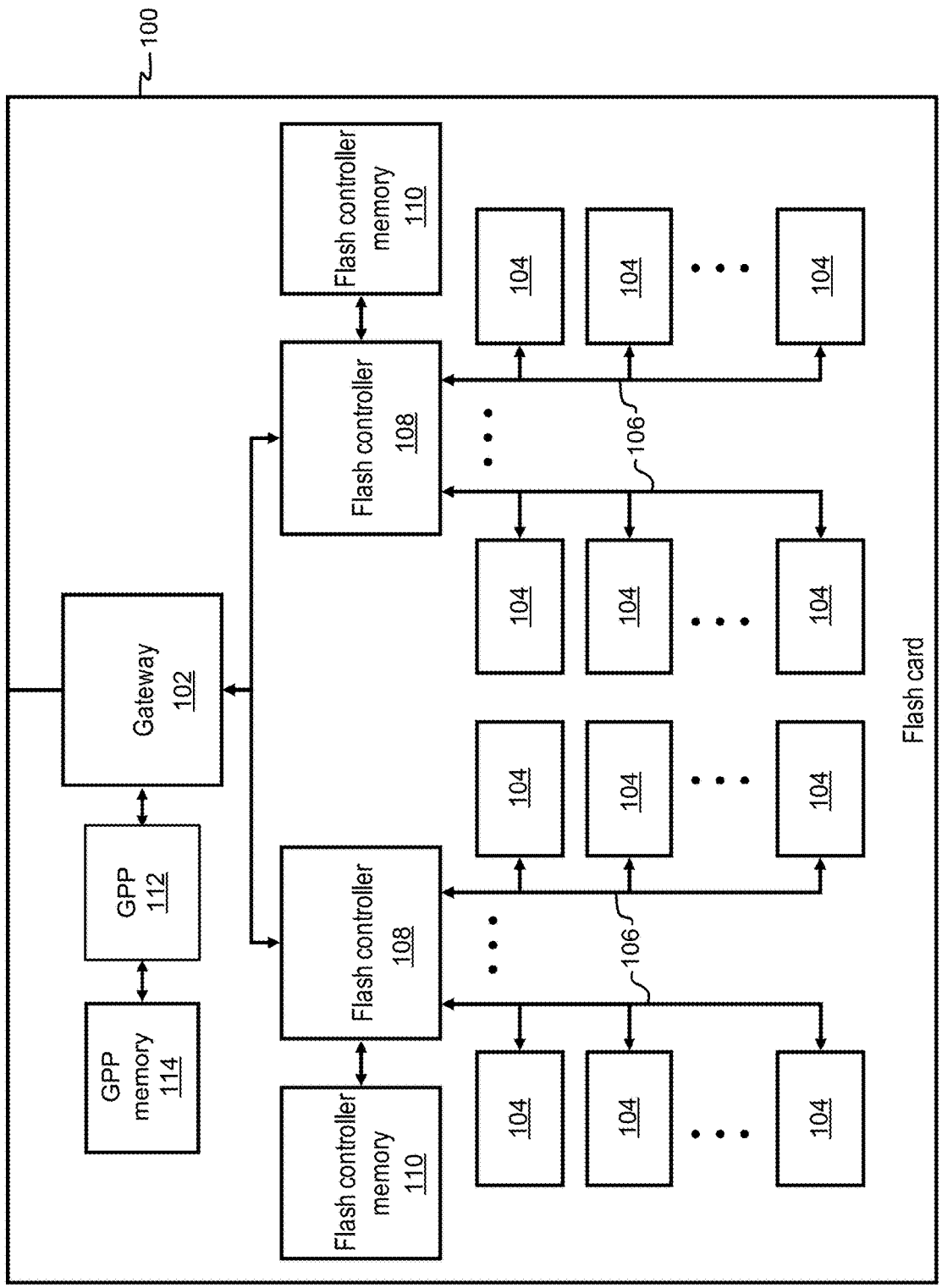
FIG. 1 shows a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. Various embodiments described herein are able to achieve direct addressing of data in cache based on a physical block address (PBA). Moreover, different embodiments introduced throughout the present disclosure are able to retrieve the PBA from a present cache location for write operations. Furthermore, various embodiments described and/or suggested herein are able to achieve full channel parallelism for multiple streams across multiple pages and/or page-stripes concurrently, as will be described in further detail below.

It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a system includes non-volatile memory, and a non-volatile memory controller having a cache. An architecture of the cache supports separation of data streams, and the cache architecture supports parallel writes to different non-volatile memory channels. Additionally, the cache architecture supports pipelining of the parallel writes to different non-volatile memory planes. Furthermore, the non-volatile memory controller is configured to perform a direct memory lookup in the cache based on a physical block address.

In another general embodiment, a method includes separating, using a non-volatile memory controller, data to be written to a non-volatile memory into multiple data streams in cache based on heat of the data, writing the separated data from the cache to the non-volatile memory in parallel through parallel writes to different channels and pipelining of those writes to different planes, and performing a direct memory lookup in the cache based on a physical block address.

In yet another general embodiment, a computer program product includes a computer readable storage medium having program instructions embodied therewith, the program instructions readable and/or executable by a controller to cause the controller to: separate, by the controller, data to be written to a non-volatile memory into multiple data streams based on heat of the data, write, by the controller, the separated data from a cache to the non-volatile memory in parallel through parallel writes to different channels and pipelining of those writes to different planes, and perform, by the controller, a direct memory lookup in the cache based on a physical block address.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
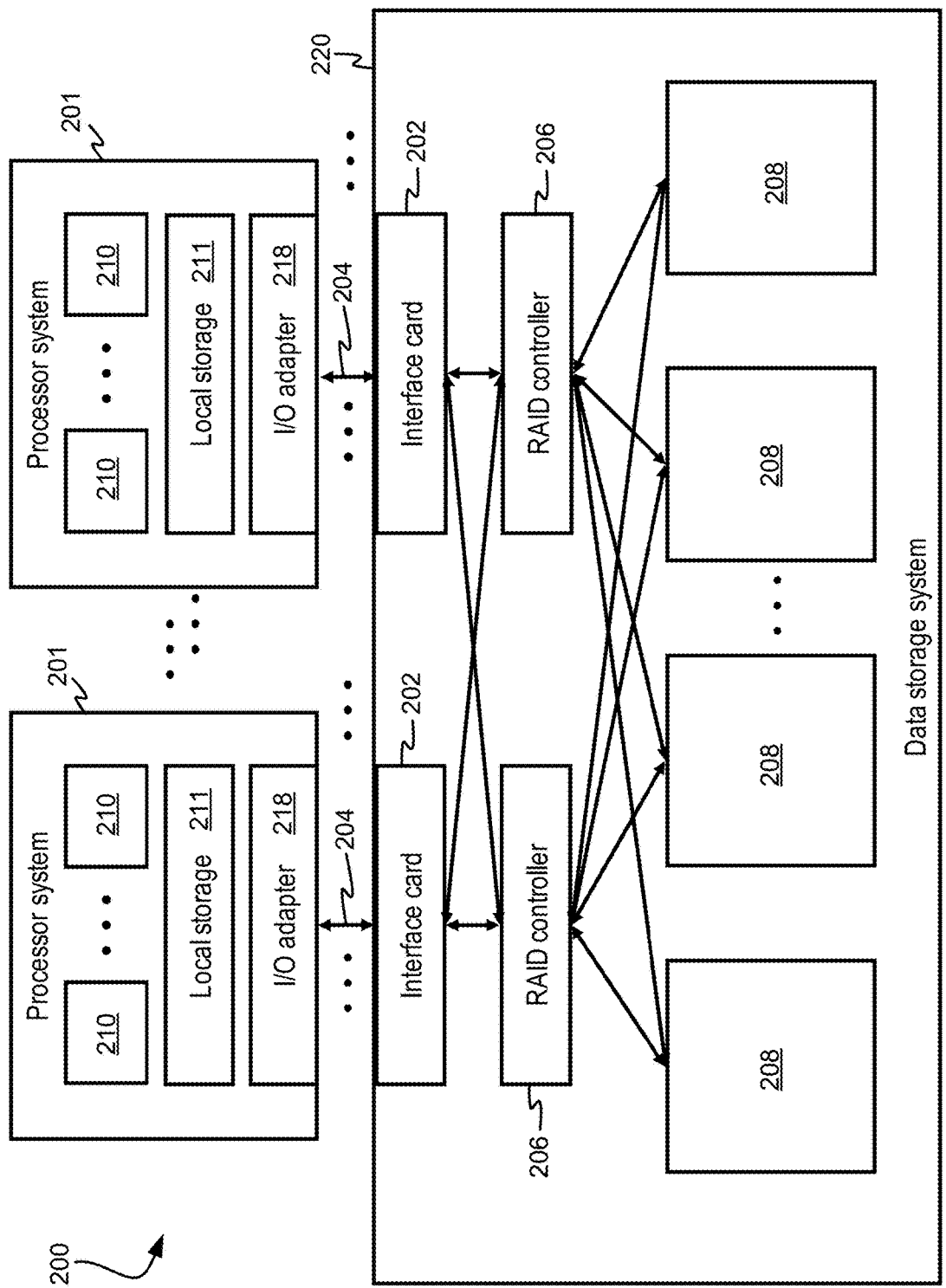
FIG. 2 shows a data storage system architecture, in accordance with one embodiment.

As previously mentioned, memory card 100 may be implemented in various types of data storage systems, depending on the desired embodiment. FIG. 2 illustrates a data storage system architecture 200 is shown according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 1114 of FIG. 11, ROM 1116 of FIG. 11, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers 108 and/or other controllers described herein may implement a cache which replicates a non-volatile memory structure (e.g., architecture) according to the various embodiments described below. Furthermore, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, block-stripes may be identified for being reclaimed and/or relocated. According to an example, which is in no way intended to limit the invention, a block-stripe may be identified in a RAID scheme by grouping multiple non-volatile memory blocks from different lanes (i.e., channels) together. Further detail is provided below in the conceptual diagram 400 of FIG. 4.

It should also be noted that a block-stripe may include any multiple of the physical memory block, which is a minimal physical unit of erasure. Moreover, the organization of memory blocks into block-stripes allows for adding RAID-like parity protection schemes among memory blocks from different memory chips, memory planes and/or channels as well as significantly enhancing performance through higher parallelism.

According to an exemplary embodiment, which is in no way intended to limit the invention, memory controllers (e.g., see 108 of FIG. 1) may internally perform a garbage collection. As previously mentioned, the garbage collection may include selecting a block-stripe to be relocated, after which all data that is still valid on the selected block-stripe may be relocated (e.g., moved). After the still valid data has been relocated, the entire block-stripe may be erased and thereafter, used for storing new data. The amount of data relocated from the garbage collected block-stripe determines the write amplification. Moreover, an efficient way to reduce the write amplification includes implementing heat segregation.

Heat Segregation

In the present context, the "heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

It should be noted that the number of read requests to and/or read operations performed on a memory block may not come into play when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat segregated block-stripe tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same block-stripe as the hot data being relocated. Therefore the write amplification incurred by performing garbage collection is much lower for embodiments implementing heat segregation.

Secondly, the relative heat of data can be utilized for wear leveling purposes. For example, hot data may be placed in younger (e.g., healthier) memory blocks, while cold data may be placed on older (e.g., less healthy) memory blocks relative to those younger memory blocks. Thus, the rate at which relatively older blocks are exposed to wear is effectively slowed, thereby improving the lifetime of a given data storage system implementing heat segregation.

However, previous attempts to implement heat segregation in conventional non-volatile memory controllers have fallen short of producing desirable results. Specifically, conventional hardware typically organizes block-stripes into planes. Moreover, in order to achieve high write performance, block-stripes from different planes are filled with data in a page-stripe, round-robin fashion over all planes, which requires open block-stripes on each plane of such conventional products.

In contrast, various embodiments described herein include novel cache implementations which replicate non-volatile memory structures. The novel cache implementations may thereby be capable of overcoming the aforementioned conventional shortcomings, as will be described in further detail below.

Write Allocation

Write allocation includes placing data of write operations into free locations of open block-stripes. As soon as all pages in a block-stripe have been written, the block-stripe is closed and placed in a pool holding occupied block-stripes. Typically, block-stripes in the occupied pool become eligible for garbage collection. The number of open block-stripes is normally limited and any block-stripe being closed may be replaced, either immediately or after some delay, with a fresh block-stripe that is being opened.

During performance, garbage collection may take place concurrently with user write operations. For example, as a user (e.g., a host) writes data to a device, the device controller may continuously perform garbage collection on block-stripes with invalid data to make space for the new incoming data pages. As mentioned above, the block-stripes having the garbage collection being performed thereon will often have some pages that are still valid at the time of the garbage collection operation; thus, these pages are preferably relocated (e.g., written) to a new block-stripe.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

As described above, previous attempts to implement heat segregation in conventional non-volatile memory controllers have fallen short of producing desired results. In sharp contrast, various embodiments described herein include controller configurations in which non-volatile memory structures are replicated at the cache level, and are capable of overcoming the aforementioned conventional shortcomings. Specifically, different embodiments herein may include a controller cache architecture which implements heat segregation through support of writes to different data streams in parallel. Embodiments may further achieve high write bandwidth to the memory hardware through parallel writes to the different memory channels in addition to pipelining those writes to different memory planes, as will be described in further detail below.

It follows that various embodiments described herein may preferably be implemented in combination with an NVRAM based SSD controller which is capable of writing data out-of-place, e.g., in a log-structured manner, in addition to maintaining a logical-to-physical mapping of the written data. However, it should again be noted that various embodiments herein may be implemented with a wide range of memory mediums and the explicit description of NVRAM based SSD controllers is in no way intended to limit the invention.

Figure 3:
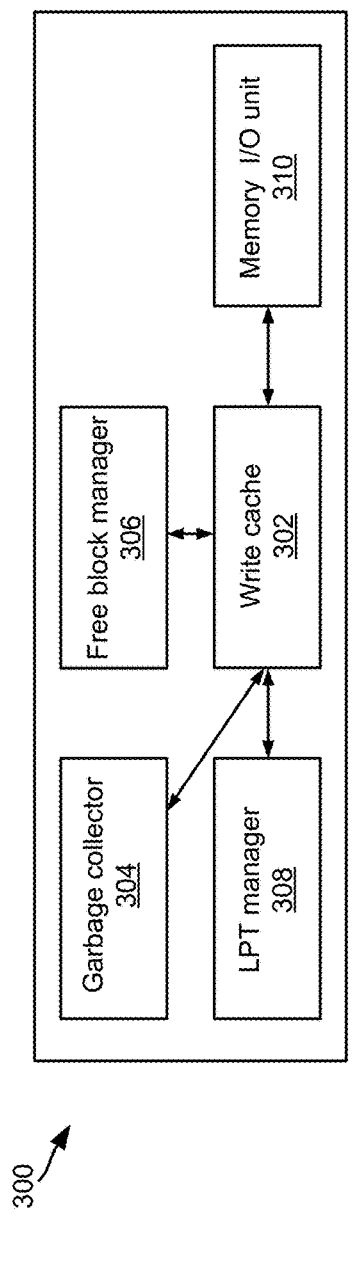
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free block-stripe by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
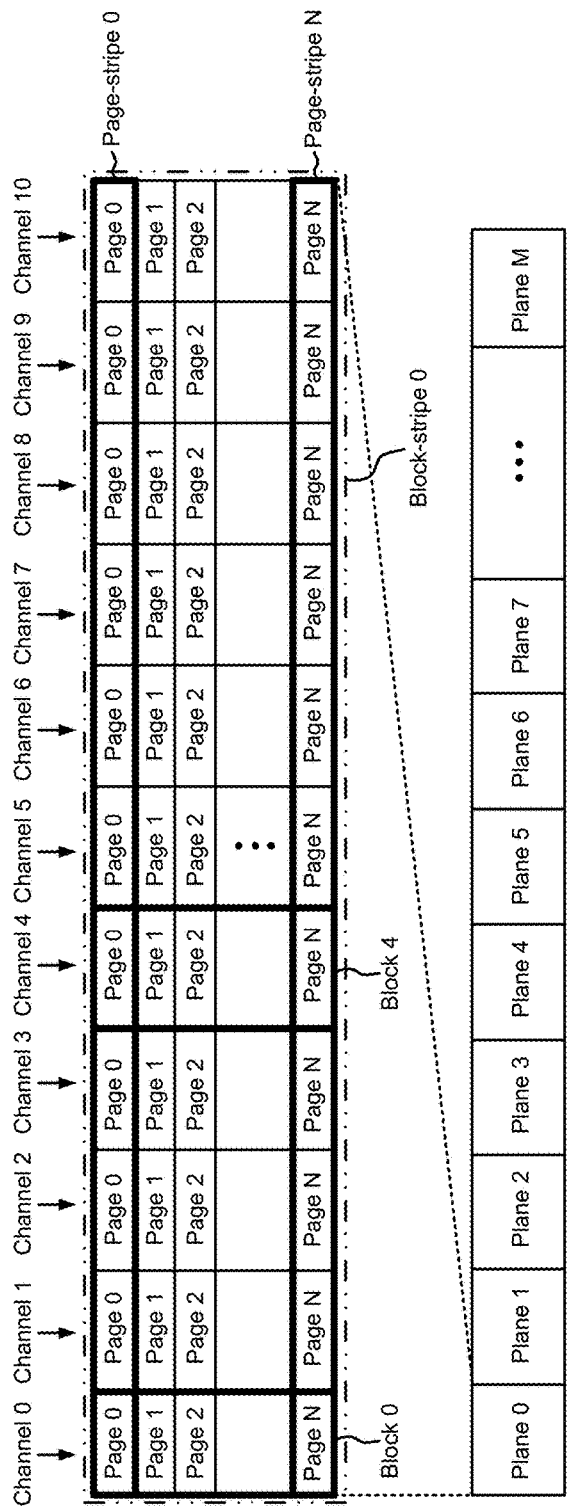
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. According to one example, as previously mentioned, it may be desired that non-volatile memory controller structures be replicated at the cache level of the various embodiments described herein. Thus, the exemplary non-volatile memory controller conceptual diagram 400 of FIG. 4 may be implemented in a cache architecture according to the desired embodiment.

Looking now to FIG. 4, the conceptual diagram 400 includes a set of M+1 planes labeled "Plane 0" through "Plane M". Each plane is shown as including 11 blocks of N+1 pages labeled "Page 0" through "Page N", and 11 channels labeled "Channel 0" through "Channel 10" as shown in the exploded view of Plane 0. In different embodiments, the number of pages in each block may vary depending on the desired embodiment. According to an exemplary embodiment, which is in no way intended to limit the invention, a block may include 256 pages, but could include more or less in various embodiments.

Each block of pages constitutes a unique block. Similarly, each channel corresponds to a single, individual block. For example, looking to conceptual diagram 400, Block 0 includes all pages (Page 0 through Page N) in Channel 0 while Block 4 corresponds to all pages in Channel 4, and so on.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes. It follows that each plane may include a block-stripe. Thus, according to an illustrative embodiment, Block 0 through Block 10 may constitute a block-stripe.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Heat Tracking and Data Segregation.

As previously mentioned, any of the embodiments described herein may implement heat tracking and/or segregation of data. Specifically, according to some embodiments, the temperature of a datum (e.g., a 4 KiB logical page, a non-volatile memory block, a block-stripe, etc.) in the context of heat segregation may be categorized based on the update frequency of that datum. However, as will soon become apparent, heat tracking and/or segregation may include a variety of design choices. For example, the granularity of a datum at which heat (temperature) is tracked, the resolution of the heat, the procedure used to update the heat, the resolution at which data segregation is performed (e.g., the number of streams), and/or the mapping of one or more heat values to a given stream may be designated as modifiable design parameters in a heat segregating scheme, some of which will be described in further detail below.

According to some embodiments, the granularity of heat tracking may vary depending on the desired implementation. According to preferred embodiments, an n-bit saturating counter augments the LPT entry of each datum (e.g., logical page) to track heat. Depending on the size of the counter, the n-bit saturating counter may provide different amounts of resolution. For example, a 3-bit counter would provide a resolution of 8 distinct heat values, while a 2-bit counter would provide a resolution of 4 unique heat values. Furthermore, heat tracking may be updated at the same regularity at which the LPT maps data to physical pages.

When an n-bit saturating counter reaches its maximum distinct heat value, any subsequent increments to the counter do not affect its value. For example, once a 2-bit counter has reached a maximum value of 3 (e.g., corresponding to a range of 0 to 3), the counter will retain its value of 3 despite any subsequent increments performed thereon, and thereby may be considered as being "saturated". However, it should be noted that reaching a maximum value does not prevent a 2-bit saturating counter from being decremented to a value of 2 and subsequently incremented again to a value of 3.

When determining the size of the n-bit saturating counter, maximum granularity (resolution) is desired. However, it is also preferred that the bits used to form the counter would otherwise have been unused. For example, it is desirable when unused bits of the LPT entries, e.g., due to byte-alignment for memory accesses, are used to form the n-bit saturating counter. It follows that the resolution of the n-bit saturating counter may be limited depending on the number of unused bits of the LPT entries.

According to an illustrative example, which is in no way intended to limit the invention, an LPT table may have 32 bits per LPT entry, e.g., to enable a physical capacity of up to 1 Tbyte. Thus, according to this example, 30 of the 32 bits may be used to address the physical capacity, thereby leaving 2 bits unused. As a result, an n-bit saturating counter may include the 2 unused bits, thereby allowing for 4 unique temperature values to be tracked without repurposing any of the 32 bits. However, according to different embodiments, the architecture may be able to support more or less bits as desired.

Exemplary embodiments may track heat at the 4 KiB logical page level. However, if tracking heat at a 4 KiB logical page granularity is prohibitive from an implementation point of view, heat tracking may alternatively be implemented at the non-volatile memory block and/or block-stripe level. Specifically, the heat of a logical address may be deduced from the data stream at which its physical data resides.

Alternatively, the resolution at which data segregation is performed may be dictated by the number of different data streams that a memory controller is able to support. Typically, the number of data streams a memory controller is able to support is less than or equal to the number of heat values supported in heat tracking.

Looking to Table 1, an exemplary outline of a mapping function implementing a 2-bit counter having four unique values, in combination with two data streams is presented. However, it should be noted that other functions may be used to map heat values to data streams in alternate embodiments as would be appreciated by one skilled in the art upon reading the present description.

TABLE 1

| Heat | Stream |
|------|--------|
| 0    | 0      |
| 1    | 0      |
| 2    | 1      |
| 3    | 1      |

As shown, the mapping function according to the present exemplary embodiment groups datum having either of the lower two heat values (i.e., 0 and 1) into cold data stream 0, while datum corresponding to either of the two higher heat values (i.e., 2 and 3) are grouped into hot data stream 1. However, again it should be noted that the mapping structure illustrated in Table 1 is presented by way of example only. Any other type of mapping scheme may be implemented depending on the desired embodiment.

The heat value corresponding to a datum (e.g., logical page) is preferably incremented by one unit when the data of the datum is in the process of being updated, e.g., overwritten. Alternatively, the heat value corresponding to a datum is preferably decremented by one unit when the datum is in the process of being relocated. Decrementing the heat upon data relocation preserves the detail that relocated data have not been updated as fast as the rest of the data in their block-stripe and can thus be presumed to be "colder" in comparison to the data in the block-stripe which is overwritten.

Write Cache.

As previously mentioned, embodiments described herein preferably include a non-volatile memory controller architecture and/or structure(s) replicated at the cache level, e.g., in write cache 302 of FIG. 3. The functionality of the write cache in combination with its interface with memory and other components described herein enable the write cache to support multiple data streams in parallel, as will be discussed in further detail below. For example, a controller cache architecture may maintain a set of write (de-stage) buffers that hold recently written data. Thus, an architecture of the cache may support the separation of two or more data streams, e.g., having different heats. According to another example, full page-stripe writes may be performed, e.g., to achieve channel parallelism.

Figure 5:
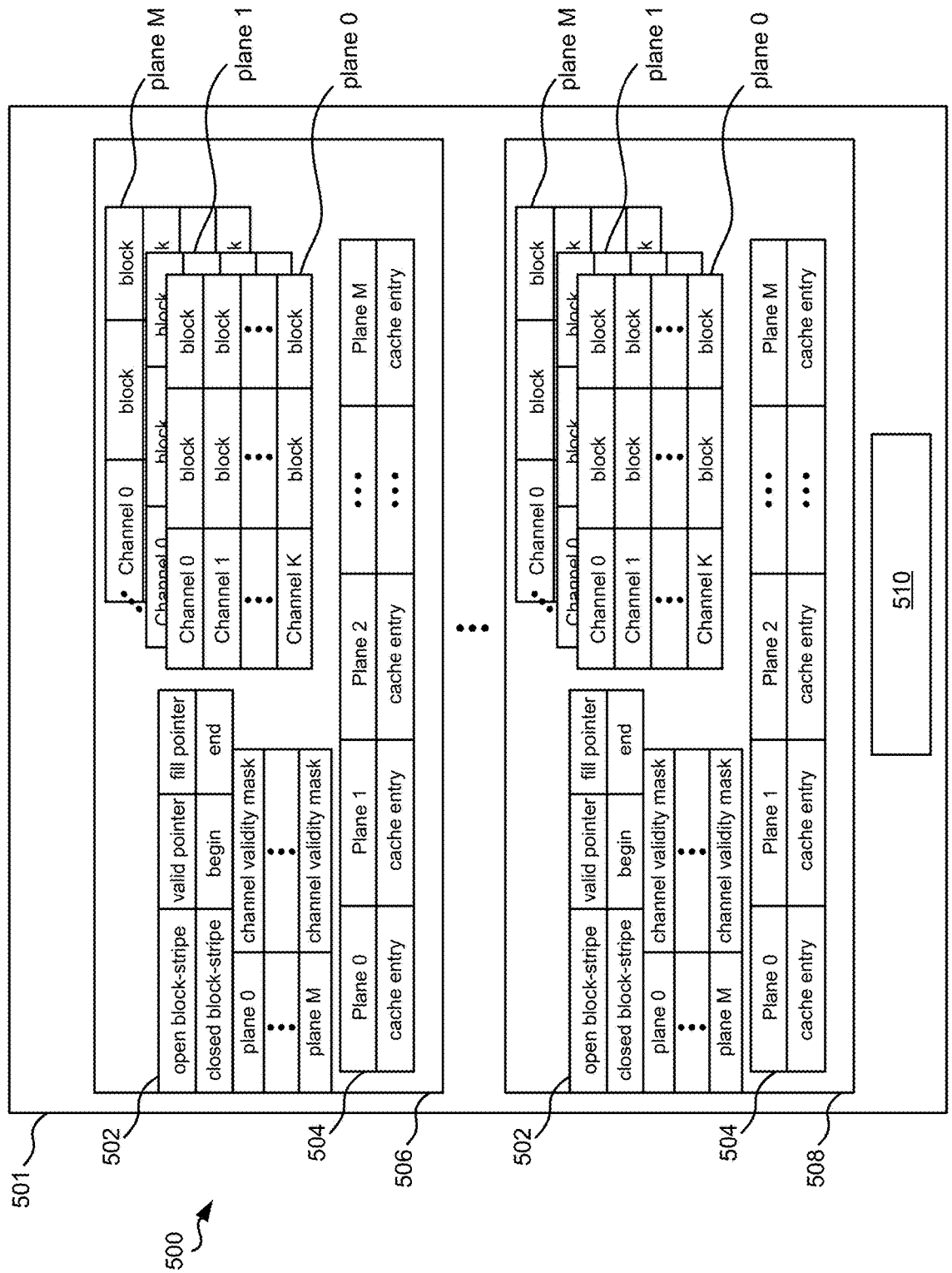
FIG. 5 is a high level architecture, in accordance with one embodiment.

Looking to FIG. 5, a high level architecture 500 of a write cache 501 is illustrated in accordance with one embodiment.

As an option, the present high level architecture 500 may be implemented in conjunction with features from any other embodiment listed herein, such as those described with reference to the other FIGS. However, such high level architecture 500 and others presented herein may be used in various applications and/or in permutations which may or may not be specifically described in the illustrative embodiments listed herein. Further, the high level architecture 500 presented herein may be used in any desired environment.

The high level architecture 500 of the write cache 501 includes an overview of Data Stream 0 506 and Data Stream N 508 of a series of N+1 data streams, in addition to de-stage arbitrator 510. Each data stream overview illustrates a first table 502 having cache entries for the M+1 planes, which preferably provides a buffer to which data may be written. Moreover, looking to second table 504 and planes labeled Plane 0 through Plane M, each data stream overview preferably includes a control structure for which lookup operations and/or updates are performed, e.g., according to the various embodiments described herein.

For an embodiment having "N+1" page-stripes, when page-stripe "N" has been filled, and additional page-stripes are requested to complete a write operation, page-stripe 0 of a different block may be accessed to perform the remainder of the write operation. As a result, a cache entry may have "K" page-stripes which is preferably less than a number of N+1 page-stripes of a memory block-stripe (e.g., see FIG. 5). The K page-stripes may thereby map to consecutive page-stripes within a block-stripe. For example, assuming the architecture 500 includes blocks of 256 pages, page-stripe 254 and 255 of one block may be accessed while page-stripe 0 and 1 of another block are accessed concurrently. It follows that one or two blocks may be open and written to at the same time. Furthermore, each data stream is capable of including up to two blocks open per plane, thereby enabling a cache entry to map to two blocks at the same time.

Once all channels of a page-stripe, e.g., page-stripe 0 for instance, are filled with data across all planes, the data of page-stripe 0 may be sent to memory (e.g., NVRAM) and executed in full parallelism with continued operations conducted in cache, e.g., performing full page-stripe writes to achieve channel parallelism. Thus, the cache is able to continue filling blocks of the next page-stripe (page-stripe 1 in this example) in a round-robin manner across the planes. It should be noted that although the data of page-stripe 0 may have been sent to memory, it is preferred that the buffer of page-stripe 0 is not freed until the write to memory (e.g., NVRAM) has been completed.

As a result, referring still to FIG. 5, write cache 501 may be able to absorb all user and/or relocate writes, and only de-stage full page-stripes to memory, e.g., using de-stage arbitrator 510. Furthermore, page-stripes to different hardware planes may be pipelined in a round-robin matter, e.g., to reduce latency of a single page write, and thereby achieve the maximum write-bandwidth corresponding memory chips are able to provide. The de-staging of full page-stripes may also simplify the implementation of the write-arbitration between the different data streams, e.g., on a per page-stripe basis to avoid collisions of writes to the same planes.

According to an exemplary embodiment, which is in no way intended to limit the invention, a cache entry page-stripe is not freed, and subsequently cannot be reused, before all the physical pages of the cache entry page-stripe, in addition to the page-stripe which the cache entry page-stripe straddles to, are written to memory. In some embodiments, a cache entry page-stripe may not be freed until all outstanding reads to any given logical page in the current page-stripe have also been completed. As a result, a valid pointer remains at page-stripe 0 and does not advance until the data of page-stripe 0 and page-stripe 1 is written completely to memory (e.g., NVRAM). It follows that valid data is located between a valid pointer and a fill pointer, as will be described in further detail below, e.g., see FIG. 7. Moreover, this valid data may be read directly from cache.

As writes to memory are completed, the valid pointer advances to subsequent page-stripes, thereby freeing the previous page-stripes to be allocated with new data. For example, once a valid pointer moves from page-stripe 0 to page-stripe 1, the blocks of page-stripe 0 are free to be reallocated, e.g., in a circular fashion.

Referring still to FIG. 5, table 502 of architecture 500 includes a channel validity mask for each plane. A channel validity mask may enable control of wear leveling across channels and/or planes. In some embodiments, it may be desirable to not write to some planes, e.g., to prevent wear thereto, in which case all channels having a corresponding channel validity bit not set may be skipped. Moreover, similar effects may be achieved for specific channels, e.g., depending on the desired embodiment. It should also be noted that channel validity masks implemented in the architecture 500 may be changed as desired, e.g., using firmware.

Table 502 also includes pointer pairs for both open and closed block-stripes. According to an exemplary embodiment, which is in no way intended to limit the invention, a set of block-stripes being filled may be identified using an open block-stripe, while a set of block-stripes which have finished being written to, but are still in cache may be identified using a closed block-stripe. Furthermore, a valid pointer indicates the beginning of the earliest valid cached page-stripe for the corresponding block-stripe (e.g., the oldest page-stripe in a block-stripe that has been allocated but not yet freed) while the fill pointer indicates the last written page in the corresponding block-stripe which does not translate to the page to which a proceeding write operation will be performed. It follows that a pair of fill and valid pointers may be used for each of the open and closed block-stripes.

When only open block-stripes are being filled at any point in time, only the fill pointer of the open block-stripes may be queried at the time of a write. Alternatively, the set of fill and valid pointers for the closed block-stripes may be queried only when read operations are performed, e.g., to check if up-to-date data is still located in the cache.

It follows that the write cache architecture 500 of FIG. 5 is able to support S unique data streams and M open block-stripes per stream. In preferred approaches, the architecture of the cache is capable of supporting the separation of two or more data streams, e.g., having different heats. However, in other approaches, a write cache architecture may only support one data stream per plane.

Each block-stripe buffers the data corresponding thereto in a cache entry which may include K page buffers per page-stripe (e.g., one per channel) and/or L open page-stripes per open block-stripe, where K and L are selected or defined according to system parameters. Additionally, as previously mentioned, each data stream may include up to two blocks open per plane, thereby enabling a cache entry to map to two blocks at the same time. It is also preferred that the number of open page-stripes is sufficient to pipeline page-stripe writes as will soon become apparent.

Figure 6:
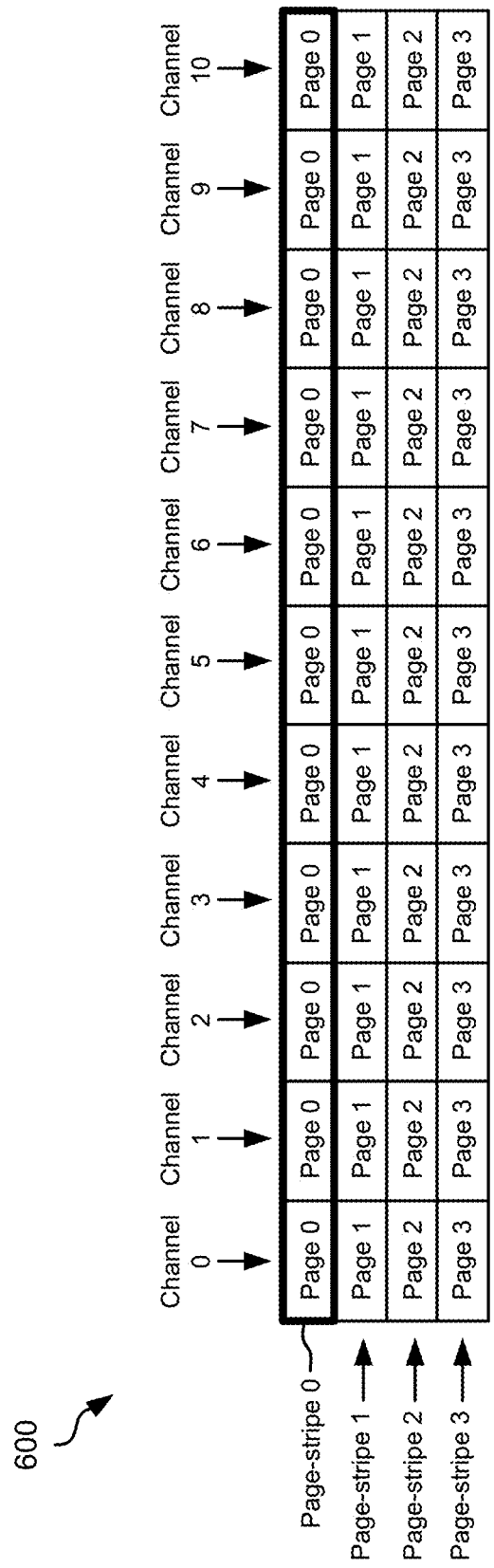
FIG. 6 is a cache entry, in accordance with one embodiment.

It is preferred that a cache entry maps to a single data stream and block-stripe. Looking to FIG. 6, a cache entry 600 is depicted as having four open page-stripes and 11 non-volatile memory channels. According to an illustrative example, which is in no way intended to limit the invention, an implementation of the cache entry 600 may include three data streams, 32 planes, 11 non-volatile memory channels, 16 KiB non-volatile memory pages and four open page-stripes per block-stripe. In view of these illustrative values, the total cache capacity may be calculated as follows: 3 data streams×32 planes×cache entry (11 channels×4 non-volatile memory-pages×16 KiB)=66 MiB.

Although it is preferred that a cache entry maps to a single data stream and block-stripe, cache designs implemented in various embodiments described herein may support straddling of data between page-stripes, as would be appreciated by one skilled in the art. Straddling may allow for a page-stripe of a cache entry to straddle to the following cache page-stripe which is adjacent thereto, e.g., directly adjacent or adjacent through wrap-around. For example, Page-stripe 0 of an embodiment may straddle to Page-stripe 1. However, the last page-stripe of a block-stripe does not straddle with any other page-stripe. Thus page straddling is disabled for page-stripe N.

Straddling may be desirable during instances in which nonalignment of a non-volatile memory page is experienced and/or in view of the host page sizes, e.g., the unit of operation, which is typically 4 KiB of host data in addition to the meta-data used for memory management and error correction. However, it should be noted that straddling is in no way a pre-requisite for the cache operations described in the various embodiments herein.

Data streams.

Each data stream has a given number of open block-stripes that are dynamically mapped to a matching number of open cache entries. Moreover, each open block-stripe per data stream has a valid pointer and a fill pointer. As previously mentioned, the valid pointer indicates the beginning of the earliest valid cached page-stripe for the corresponding stream. The earliest valid cached page-stripe in the stream is simply the oldest page-stripe in a stream that has been allocated and has not yet been freed. The fill pointer indicates the last written page in the corresponding stream which does not translate to the page to which a proceeding write operation will be performed on. To better understand the functions performed by the fill and valid pointers, reference is made to the illustration of FIG. 7.

Figure 7:
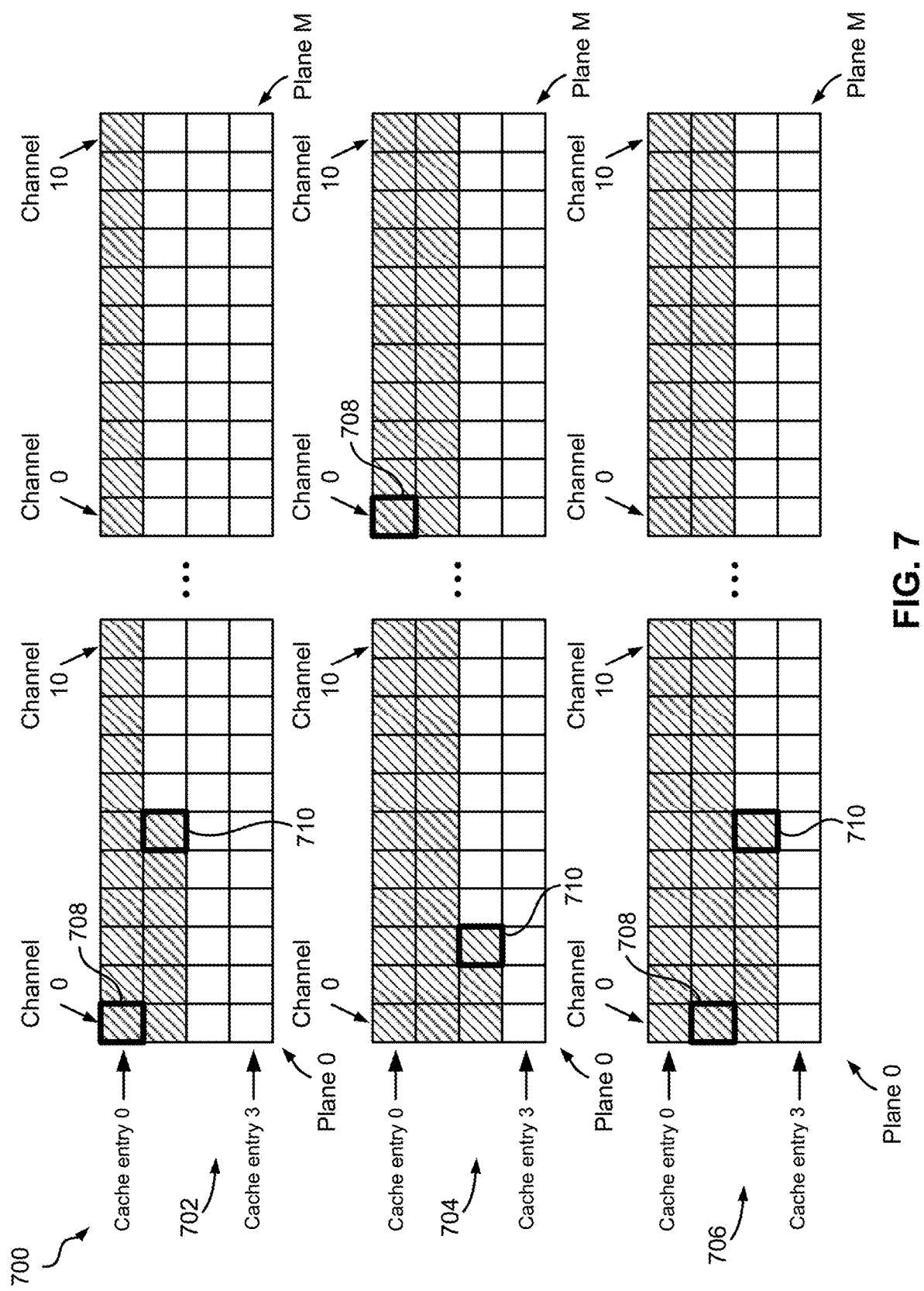
FIG. 7 is high level illustration of write cache organization for different data streams, in accordance with one embodiment.

FIG. 7 depicts a high level illustration 700 which provides an overview of a cache write procedure for three unique data streams, as well as how data filling is performed, in accordance with one embodiment. As an option, the present illustration 700 may be implemented in conjunction with features from any other embodiment listed herein, such as those described with reference to the other FIGS. However, such illustration 700 and others presented herein may be used in various applications and/or in permutations which may or may not be specifically described in the illustrative embodiments listed herein. Further, the illustration 700 presented herein may be used in any desired environment.

As an initial matter, it should be noted that although the embodiment illustrated in FIG. 7 includes three unique data streams 702, 704, 706, the fill and valid pointers may function in a similar or the same fashion with fewer or more unique data streams.

Looking now to FIG. 7, the high level illustration 700 depicts how write procedures are performed for each of the three unique data streams 702, 704, 706 simultaneously, i.e., in parallel. Each data stream corresponds to "M+1" planes, each of which have a block-stripe and four cache entries, each of which may hold a corresponding page-stripe. Moreover, without wishing to limit the invention, the three unique data streams 702, 704, 706 are identified as having heat values of "cold", "warm" and "hot", respectively. A heat level may be based on a heat count (also referred to herein as a heat value), which may also be mapped to a data stream. Thus, an embodiment may have more heat levels than uniquely segregated data streams.

Data corresponding to each stream is preferably filled across the cache entries in full page-stripes on all planes associated with the corresponding stream and/or a given heat level. For example, once a page-stripe of Cache entry 0 of Plane 0 is filled with data from cold data stream 702, a page-stripe of Cache entry 0 of Plane 1 is filled, followed by a page-stripe of Cache entry 0 of Plane 2 and so forth until a page-stripe of Cache entry 0 of Plane "M" is filled. Thereafter, data may be filled into a page-stripe of Cache entry 1 of Plane 0 as shown for cold data stream 702. Similarly for the warm and hot data streams 704, 706, writing is performed starting at a page-stripe of Cache entry 0 of the associated Plane 0. Note, however, that the same block cannot be written to from different streams, e.g., the warm and hot data streams 704, 706 cannot both be written to the block associated with the hot data stream.

Valid pointers 708 indicate the beginning of the earliest valid cached page-stripe for the corresponding stream, while fill pointers 710 indicate the last written page in the corresponding stream, which does not correspond to the page on which a proceeding write operation will be performed. Thus, cache space in front of the fill pointer 710 is free, e.g., unallocated, space. As shown for cold and hot data streams 702, 706, the valid pointer 708 may be located at the beginning of the first plane in a series. However, according to other embodiments, a fill pointer 708 may be located at a beginning of the last plane in a series, e.g., as shown for warm data stream 704.

Ideally a sufficient amount of buffer space is available in an implementation to accommodate the implementation illustrated in FIG. 7. As a result, the embodiment is able to achieve plane parallelism in view of the round-robin implementation, as well as achieve channel parallelism by performing full page-stripe writes. Moreover, the cache architecture associated with the cache write procedure illustrated in FIG. 7 supports the separation of data streams based on data heat. Note that a write operation may be stalled if all page-stripes of the cache entries of all planes are filled with data that has not yet been freed (e.g., written to non-volatile memory) while additional writes are waiting to be performed, which may indicate that a current write operation has not yet finished being performed. Thus, as alluded to above, it is preferred that the number of open page-stripes is sufficient to pipeline page-stripe writes for multiple data streams in parallel.

In view of the embodiments described above, the operations illustrated in each of FIGS. 8-9 respectively, are provided as exemplary in-use embodiments which are in no way intended to limit the invention. It follows that, as an option, the present methods 800, 900 of FIGS. 8-9 respectively, may be implemented in conjunction with features from any other embodiment listed herein, such as those described with reference to the other FIGS. According to preferred embodiments, one or more of the operations described with reference to the present methods 800, 900 may be performed by a memory controller, e.g., having cache which implements (e.g., replicates) non-volatile memory architecture.

However, such methods 800, 900 and others presented herein may be used in various applications and/or in permutations which may or may not be specifically described in the illustrative embodiments listed herein. Moreover, the methods 800, 900 presented herein may be used in any desired environment.

Thus, as a preliminary matter, it should be noted that the in-use embodiments corresponding to FIGS. 8-9 have been described with reference to Flash to provide a context, and solely to assist the reader. This has been done by way of example only, and should not be deemed limiting on the invention defined in the claims. It follows that various alternate non-volatile types of memory may be implemented, depending on the desired embodiment.

Figure 8:
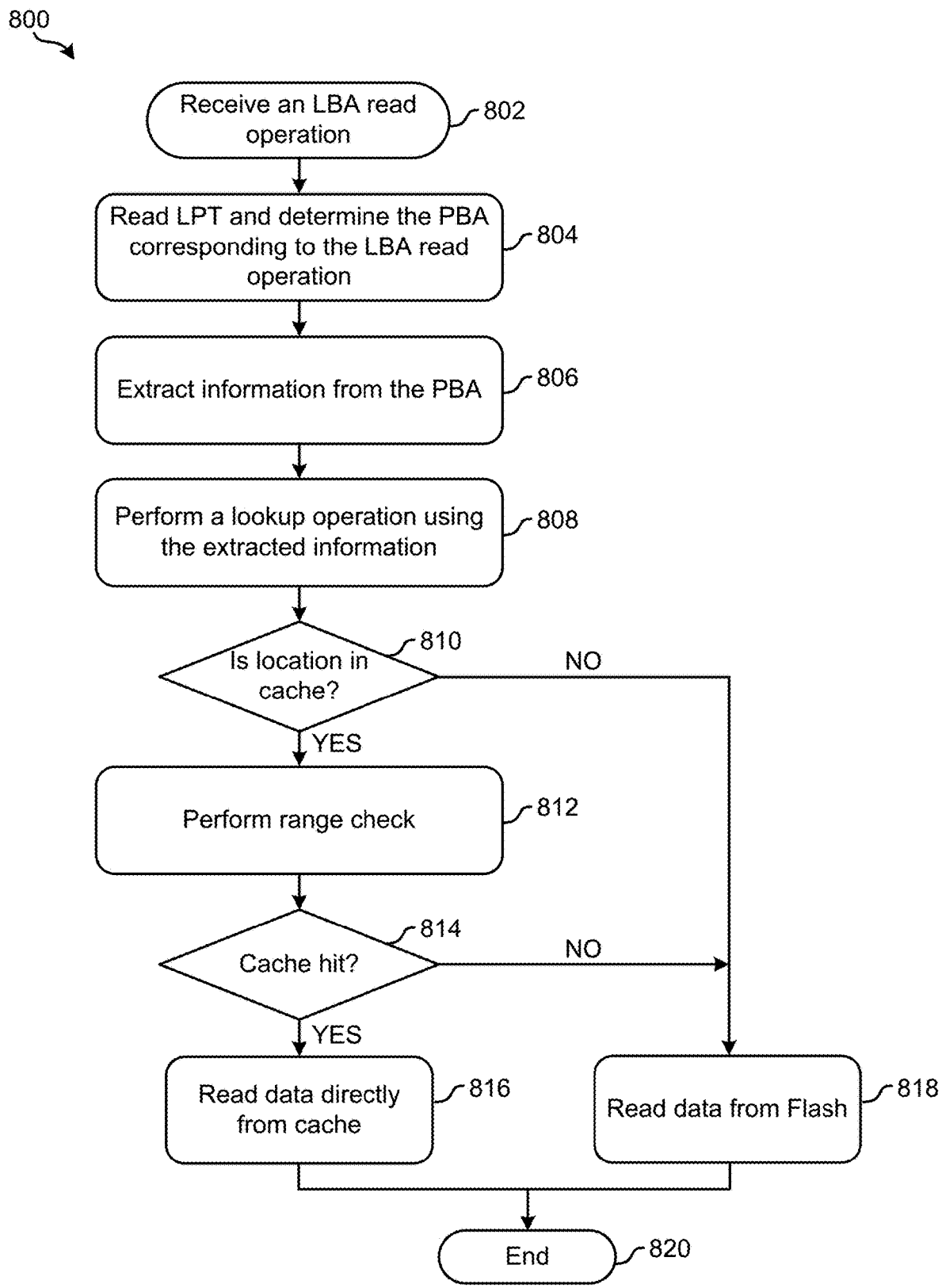
FIG. 8 is a flowchart of a method in accordance with one embodiment.

Referring now to method 800 of FIG. 8, a cache lookup procedure corresponding to a logical block address (LBA) read operation is illustrated according to an illustrative in-use embodiment. Upon receiving an LBA read operation request as shown in operation 802, it is desirable to determine whether the data corresponding to the read request is located in cache, or whether it should be retrieved directly from Flash in order to satisfy the read request. However, it should be noted that one or more operations of method 800 may be performed in response to other conditions. Thus, according to some embodiments, method 800 may begin at operation 804, e.g., without having received a LBA read operation request.

Method 800 further includes reading an LPT to determine the PBA corresponding to the LBA read operation. See operation 804. Moreover, looking to operation 806, information pertaining to the PBA, including the stream, plane, channel, and/or block thereof may be extracted from the PBA.

The information pertaining to the PBA may further be used to perform a lookup operation, e.g., in a cache table, the results of which may be used to determine whether the location to which this PBA maps to is in cache. See operation 808. It follows that a direct memory lookup may be performed based on the PBA corresponding to the LBA read operation, e.g., as a result of replicating a non-volatile memory structure at the cache level. Referring momentarily to Table 2, a cache table is illustrated according to one example, which is in no way intended to limit the invention.

TABLE 2

| Stream | Plane | Channel | Valid Blocks |
|---|---|---|---|
| Cold | 0 | 0 | 1024 / 78 |
| ... | ... | ... | |
| Cold | 31 | 15 | — / 2 |
| Warm | 0 | 0 | 1 / 10 |
| ... | ... | ... | |
| Warm | 31 | 15 | 75 |
| Hot | 0 | 0 | 1024 |
| ... | ... | ... | |
| Hot | 31 | 15 | 32 / 128 |

As illustrated, Table 2 is a cached block table which is indexed by stream, plane, channel and block. In other words, the embodiment of Table 2 is illustrated as holding valid blocks for particular streams, planes, and channels. According to some embodiments, two blocks per cache table entry may be supported, but the number of blocks supported per entry may be higher, or lower (e.g., corresponding to an instance in which straddling, for example, is not supported), depending on the desired embodiment.

A valid channel bitmask (e.g., having K bits) may exist per block-stripe to support skipping of channels per plane and/or of skipping full planes (e.g., if a valid channel bitmask is completely invalid) for wear leveling, garbage collection, throttling user writes, etc. Moreover, an embodiment implementing variable stripe RAID may be used in order to support the dynamic skipping of channels in the context of a data protection scheme like RAID.

For various embodiment described herein, the valid channel bitmask is delivered to the write cache together with the free block-stripes from a free block manager and/or a garbage collector (e.g., as illustrated in FIG. 3). Moreover, a valid channel bitmask may be stored in the block-stripe's metadata permanently for use by the RAID scheme in order to reconstruct a stripe in case of channel failure. Furthermore, conventional logic may be used to choose and/or operate a valid channel bitmask.

Referring again to FIG. 8, it is preferred that a cache table, e.g., such as Table 2, is directly indexed using the stream, plane, channel, and/or block of the PBA address to determine whether the location to which the present PBA maps to is in cache or not. Thus, as previously mentioned, a direct memory lookup may be performed based on the PBA corresponding to the LBA read operation in view of the embodiments described herein. The ability to perform a direct memory lookup based on the PBA corresponding to a LBA read operation may result from replicating a non-volatile memory structure (e.g., of a desired type) at the cache level. This ability sharply contrasts with the limitations of conventional products in which lookups are performed exclusively based on the LBA which requires the LBA to be hashed completely into the cache space. As a result, these conventional products are precluded from being able to perform parallel functionality for lookup operations.

Referring again to FIG. 8, following the lookup of operation 808, decision 810 determines whether the location to which this PBA maps to is in cache. If the location which this PBA maps to is not in cache, decision 810 directs method 800 to operation 818 which includes reading the data corresponding to the read request directly from Flash.

Alternatively, if the location which this PBA maps to is in cache, decision 810 directs method 800 to operation 812 which includes performing a range check. A range check may include using the valid and fill pointers of a data stream corresponding to the location which the PBA maps to. The range check may be used to determine whether the page which the PBA maps to still holds data, or if the data has been erased, e.g., to accommodate a subsequent cache update, as will be described in further detail below.

According to an illustrative embodiment, which is in no way intended to limit the invention, a range check may use Equation 1 as follows:

$$((page = valid\ pointer's\ page\text{-}stripe\ index\ and\ plane >= valid\ pointer's\ plane)\ or\ (page > valid\ pointer's\ page\text{-}stripe\ index))\ and\ ((plane <= fill\ pointer's\ plane)\ and\ (channel <= fill\ pointer's\ channel))$$

Equation 1

A more detailed understanding of the elements of Equation 1 may be formed in view of the high level illustration 700 of FIG. 7. The term "page" refers to the page number that the block which the PBA maps to is located, while the "valid pointer's page-stripe index" refers to the page-stripe the valid pointer is located at. Similarly, "plane" and "channel" denote the page number and channel number that the bock which the PBA maps to is located. Furthermore, "valid pointer's plane" denotes the plane number that the valid pointer is located on, "fill pointer's plane" represents the plane number that the fill pointer is located on, and "fill pointer's channel" denotes the channel at which the fill pointer is located.

Equation 1 allows for a range check to determine whether a page which a PBA maps to is located among the valid data between the valid and fill pointers, or if the PBA maps to a page located behind the valid pointer. As previously mentioned, if the page is located behind the valid pointer, it may belong to a page-stripe which has already been freed and possibly allocated with new data. However, it should be noted that a range check may be performed for open and/or closed block stripes, e.g., depending on the desired embodiment.

The range check performed in operation 812 of FIG. 8 may additionally include determining whether there are unprocessed cache write operations. This determination may be made in order to prevent starving writers which may otherwise result from performing constant outstanding cache read operations. According to one embodiment, whether there are unprocessed cache write operations may be determined using a cache hit. For example, if a cache hit page-stripe write count equals 0, and a subsequent page-stripe (e.g., the page-stripe the cache hit page-stripe straddles to) write count is also equal to 0, then a cache lookup read request may be serviced from Flash. According to some embodiments, each page-stripe of a cache entry may have an in-flight read and/or an in-flight write counter which preferably keeps track of the sum of reads and/or writes outstanding to all the physical pages in the page-stripe at any particular point in time. Thus, in-flight read and/or an in-flight write counters may be used to determine whether there are unprocessed cache write operations. According to one approach, the cache lookup read request may be delayed when the write count exceeds a threshold value which may be predetermined, calculated based on current conditions, etc. Depending on the desired approach, the cache lookup read request may be delayed until the write count drops below the threshold, a predetermined amount of time has passed, etc.

Referring again to method 800 of FIG. 8, a determination is made at decision 814 whether the range check of operation 812 succeeds, e.g., resulting in a cache hit. If decision 814 indicates that the range check did not succeed, method 800 proceeds to operation 818 which includes reading the data corresponding to the read request directly from Flash. However, if it is determined that the range check did succeed, decision 810 directs method 800 to operation 816 which includes reading the data corresponding to the read request directly from cache, e.g., at the location to which the PBA maps to. Thus, a direct memory lookup may be performed in the cache based on the PBA.

Once the data is read from either cache or Flash, method 800 may end as seen in operation 820. According to some embodiment, method 800 may enter a "ready" state upon completing a read operation, e.g., whereby additional read requests may be received and processed using any one or more of the operations included in FIG. 8.

It follows that embodiments implementing method 800 are able to achieve direct addressing of data in the cache, which also supports the separation of data streams. Specifically, data to be written to a non-volatile memory may be separated in cache based on heat of the data. Thereafter, the separated data may be written from the cache to non-volatile memory in parallel by performing parallel writes to different channels and/or pipelining those writes to different planes as would be appreciated by one skilled in the art upon reading the present description. Moreover, embodiments implementing one or more operations of method 800 may be able to achieve direct lookups of data based on a physical block address associated with the data, e.g., by replicating the non-volatile memory structure at the cache level.

These abilities serve as significant improvements over conventional products which are forced to perform complex lookups based on LBAs thereby requiring extra hash tables and logic to implement.

Figure 9:
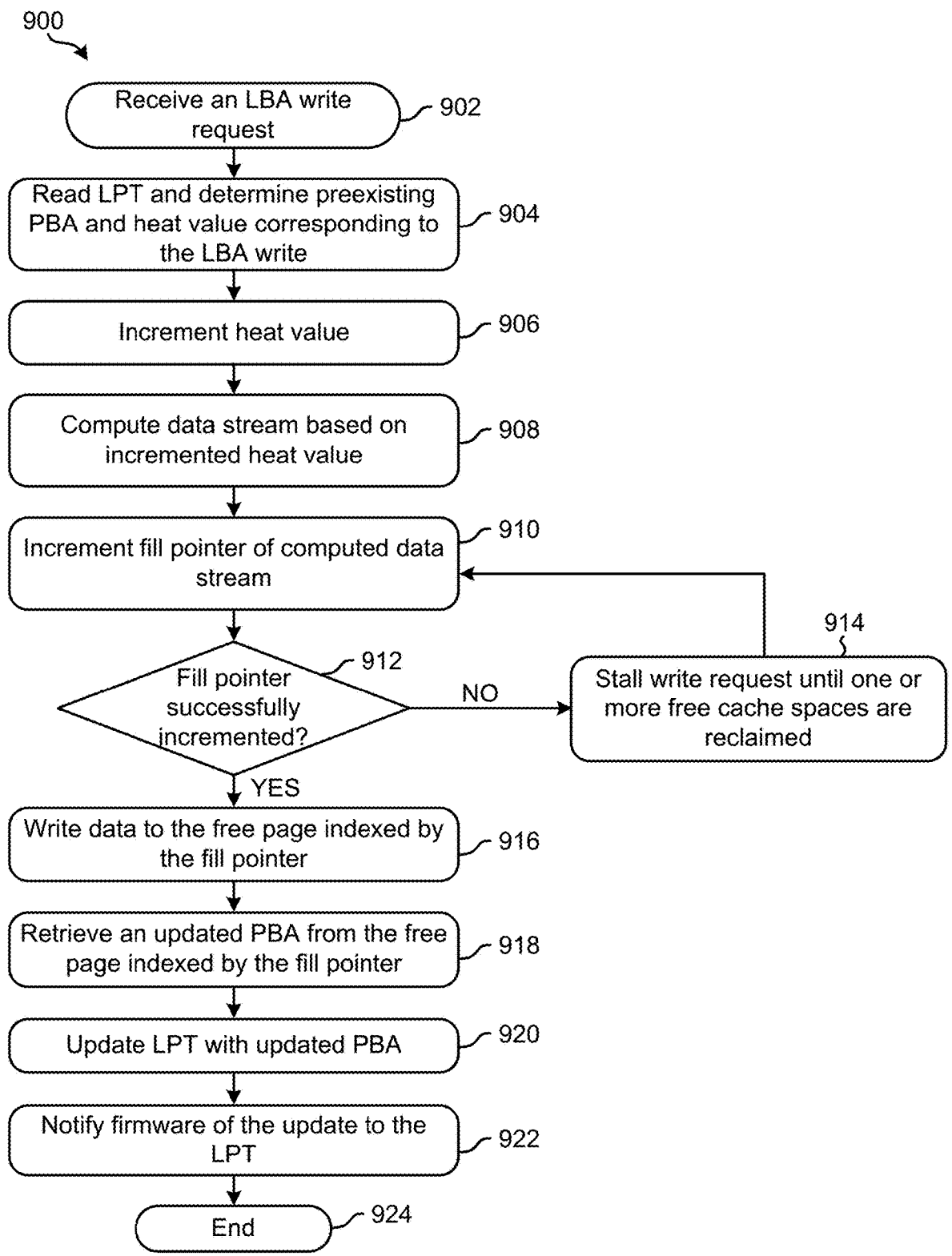
FIG. 9 is a flowchart of a method in accordance with one embodiment.

Referring now to method 900 of FIG. 9, a cache update procedure corresponding to an LBA write operation is illustrated according to an illustrative in-use embodiment. As depicted, method 900 may initiate upon receiving a write request to a logical location, e.g., from the host. See operation 902. However, it should be noted that one or more of the other operations of method 900 may be performed in response to various conditions, requests, etc., according to various embodiments.

Operation 904 includes reading an LPT to determine a preexisting PBA and associated heat value corresponding to the LBA of the write request. By querying the LPT to determine whether a preexisting PBA and/or heat value associated therewith exist, method 900 is effectively able to determine whether the LBA write request is an update or a first write. When operation 904 produces a preexisting PBA and associated heat value corresponding to the LBA of the write request, it is determined that the LBA write request is an update to the data at the preexisting PBA. Alternatively, when it is determined that no preexisting PBA and heat value corresponding to the LBA of the write request exists, it is determined that the LBA write request is a first write. The remainder of the operations and/or decisions of method 900 are described with reference to performing an LBA write which is an update; however the operations and/or decisions of method 900 may be modified as would be appreciated by one skilled in the art, to accommodate an LBA first write.

Referring still to method 900 of FIG. 9, operation 904 is followed by operation 906 which includes incrementing the heat corresponding to the LBA of the write request. As described above, heat is preferably represented with an n-bit saturating counter which may be stored in the PBA. Thus, the amount that the heat is incremented in operation 906 may depend on the granularity, saturation level, etc. of the n-bit counter. As previously mentioned, a heat counter may be updated upon each LBA write update, at the same regularity at which the LPT maps data to physical pages, etc. Moreover, the frequency of updating the heat counter may vary depending on the embodiment.

Furthermore, operation 908 includes computing a data stream based on the incremented heat. According to some embodiments, a data stream may be computed using a table, e.g., such as Table 1 presented above. However, other embodiments may include different techniques of computing a data stream based on an incremented heat as would be appreciated by one skilled in the art upon reading the present description. For example, heat values may be mapped into different data streams to implement data segregation.

Upon computing a data stream, operation 910 includes examining the fill pointer of the computed data stream and attempting to increment the fill pointer by one page buffer entry. As previously described, the fill pointer indicates the last written page in the corresponding block-stripe which does not translate to the page buffer entry to which a proceeding write request will be performed. Thus, incrementing the fill pointer denotes the page buffer entry to which a proceeding write operation will be performed.

However, if the cache is full, the fill pointer will not be able to be incremented, regardless of attempts to do so, as there are no free page buffer entries. As a result, the write request cannot currently be performed. Thus, looking to decision 912, whether the fill pointer is incremented determines whether a free page exists in the data stream cache. If the fill pointer cannot be incremented, decision 912 results in a "No" and method 900 is directed to operation 914 which stalls the write request (e.g., the write request may be stored, delayed, etc.), preferably until one or more free cache spaces are reclaimed from one or more de-staged page-stripes. Following operation 914, method 900 preferably returns to operation 910 and again attempts to increment the fill pointer by one page buffer entry.

However, if the fill pointer is successfully incremented, it is determined at decision 912 that a free page does exist in the data stream cache, and method 900 is directed to operation 916 which includes writing the data of the LBA write request to the free page indexed by the fill pointer of the data stream.

Once the data has been written, method 900 retrieves an updated PBA from the location indicated by the fill pointer of the data stream (i.e., at the page the data was just written to). See operation 918. The updated PBA may be determined uniquely in view of the cache entry location. Moreover, the cache entry location may be determined using the stream, plane, channel, block, and page-stripe of the channel which was implicitly mapped in the cache entry for embodiments replicating the flash structure in the write cache as described above. As a result, various embodiment described herein are desirably able to determine the updated PBA directly from the cache entry to which the write operation was performed.

Furthermore, operation 920 includes implementing the updated PBA into the LPT. Upon implementing the updated PBA into the LPT, the previous PBA (i.e., the PBA which the LBA mapped to before the update) is preferably invalidated.

Referring still to FIG. 9, operation 922 includes notifying firmware, e.g., the garbage collector, of the update, including the invalidation of the previous PBA. This notification may be made by sending the previous PBA to firmware. Thereafter, method 900 ends as seen in operation 924. According to some embodiment, method 900 may enter a "ready" state upon completing a read operation, e.g., whereby additional read requests may be received and processed using any one or more of the operations included in FIG. 9.

As previously mentioned, the operations and/or decisions of method 900 may be modified as would be appreciated by one skilled in the art, to accommodate an LBA first write. According to an illustrative example, which is in no way intended to limit the invention, when an LBA write request is a first write to an LBA, the write request does not correspond to a preexisting PBA or heat value. Therefore, a stream in which the write request is to be performed is selected. It is preferred that a heat counter of a first write is set to the lowest (coldest) value, thereby assigning the write request to a cold data stream. The write request may be written to the next valid page of the cold data stream, after which the LPT may be updated with a PBA, heat value, etc. associated with the executed LBA write request. It should be noted that in various embodiments, the heat value assigned to a first write may be different than the lowest (coldest) value. For example, embodiments regularly receiving frequently updated data may assign a higher (hotter) value thereto.

Similar to write request operations, a recirculation occurs when a page is relocated as a result of garbage collection. According to an exemplary embodiment which is in no way intended to limit the invention, performing a recirculation for a PBA begins with reading the PBA, e.g., to locate data corresponding to the recirculation. The process of reading the PBA may include using steps similar to those of a cache lookup procedure. It follows that a recirculation may initiate by performing any one or more of the operations described above with reference to the cache lookup procedure of FIG. 8, preferably to determine whether the data corresponding to the PBA of the recirculation is located in cache or Flash.

Once the location of the data has been determined, the recirculation may further extract the LBA back-pointer from the logical page header which exists in the physical page at which the data is stored. Upon extracting the LBA back-pointer, the LPT is examined to ascertain the LBA and determine whether the LBA still maps to the PBA. If it is determined that the LBA does not map to the PBA, the recirculation may be stopped and abandoned in view of the fact that the mapping is no longer valid. However, if it is determined that the LBA does still map to the PBA, the recirculation may proceed. According to an illustrative example, which is in no way intended to limit the invention, the write heat of the LBA may be decremented, e.g., by one unit. The write heat of the LBA may be decremented by one unit to reflect the fact that it is being relocated, which suggests it has not been updated for some time. It should be noted that in various embodiments, the heat value may be modified differently than being decremented by one unit. For example, embodiments that support a small number of heat values may reset the heat value to the lowest supported value upon a recirculation.

Finally, the recirculation preferably includes an LBA write operation being performed using any one or more of the operations described above for a cache update procedure, e.g., with reference to FIG. 9.

As previously mentioned, memory controllers and/or other controllers described herein (e.g., RAID controllers 206 of FIG. 2) may be able to perform various functions on stored data, depending on the desired embodiment. Specifically, RAID controllers (e.g., see 206 of FIG. 2) and/or other controllers described herein may implement a cache which replicates the architecture of a given non-volatile memory, according to the various embodiments described herein. According to one example, all channels of embodiments having RAID-0 may be used for data. However, certain channels may be skipped, e.g., based on their validity bit at a currently open block-stripe in the stream data is placed to.

According to another example, embodiments may include RAID with distributed parity (e.g., RAID-5 or RAID-6). In such embodiments, one RAID-5, two RAID-6 channels, etc. may be skipped for data and the parity calculation is preferably performed downstream. Parity may be calculated for each page-stripe as data is written to the currently open page-stripe in the cache entry of the data stream the data maps to. Moreover, the data is preferably written to the appropriate one or more channels in the same page-stripe (RAID-stripe) once it is filled. However, channels in such embodiments might also be skipped, e.g., based on their validity bit at a currently open block-stripe in the stream data is placed to.

It follows that various embodiments described herein are able to achieve direct addressing of data in the cache based on the PBA. Moreover, different embodiments introduced throughout the present application are able to retrieve the PBA from the current cache location. Thus, cache entries described herein implicitly map to the PBA through the heat, channel, block and/or the page (e.g., in the channel), thereby uniquely identifying the PBA.

Furthermore, embodiments described and/or suggested herein may be able to achieve full channel parallelism for multiple streams across multiple pages and/or page-stripes concurrently.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 10:
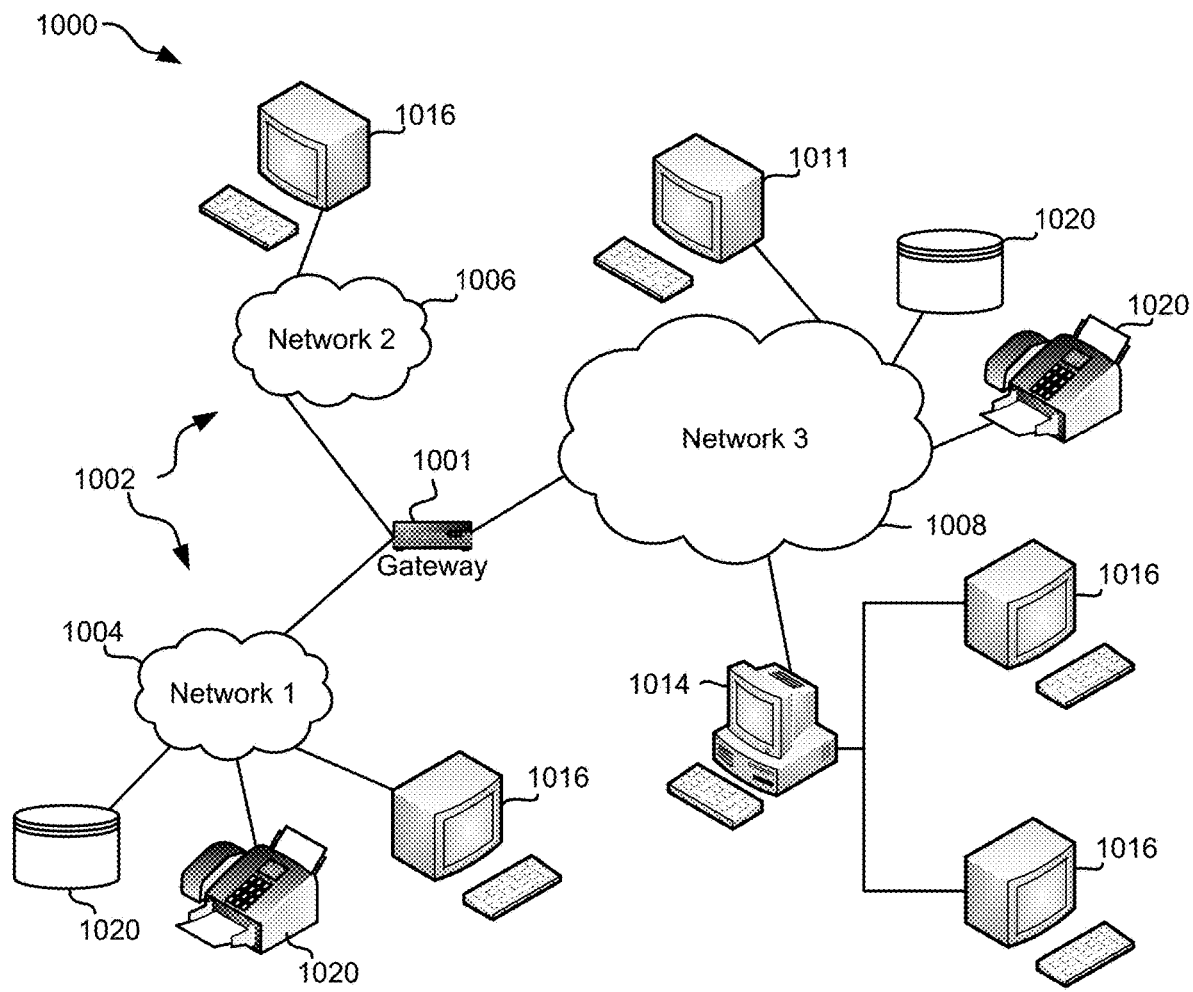
FIG. 10 is a network architecture, in accordance with one embodiment.

FIG. 10 illustrates a network architecture 1000, in accordance with one embodiment. As shown in FIG. 10, a plurality of remote networks 1002 are provided including a first remote network 1004 and a second remote network 1006. A gateway 1001 may be coupled between the remote networks 1002 and a proximate network 1008. In the context of the present network architecture 1000, the networks 1004, 1006 may each take any form including, but not limited to a LAN, a WAN such as the Internet, public switched telephone network (PSTN), internal telephone network, etc.

In use, the gateway 1001 serves as an entrance point from the remote networks 1002 to the proximate network 1008. As such, the gateway 1001 may function as a router, which is capable of directing a given packet of data that arrives at the gateway 1001, and a switch, which furnishes the actual path in and out of the gateway 1001 for a given packet.

Further included is at least one data server 1014 coupled to the proximate network 1008, and which is accessible from the remote networks 1002 via the gateway 1001. It should be noted that the data server(s) 1014 may include any type of computing device/groupware. Coupled to each data server 1014 is a plurality of user devices 1016. Such user devices 1016 may include a desktop computer, laptop computer, handheld computer, printer, and/or any other type of logic-containing device. It should be noted that a user device 1011 may also be directly coupled to any of the networks, in some embodiments.

A peripheral 1020 or series of peripherals 1020, e.g., facsimile machines, printers, scanners, hard disk drives, networked and/or local data storage units or systems, etc., may be coupled to one or more of the networks 1004, 1006, 1008. It should be noted that databases and/or additional components may be utilized with, or integrated into, any type of network element coupled to the networks 1004, 1006, 1008. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 1004, 1006, 1008, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 11:
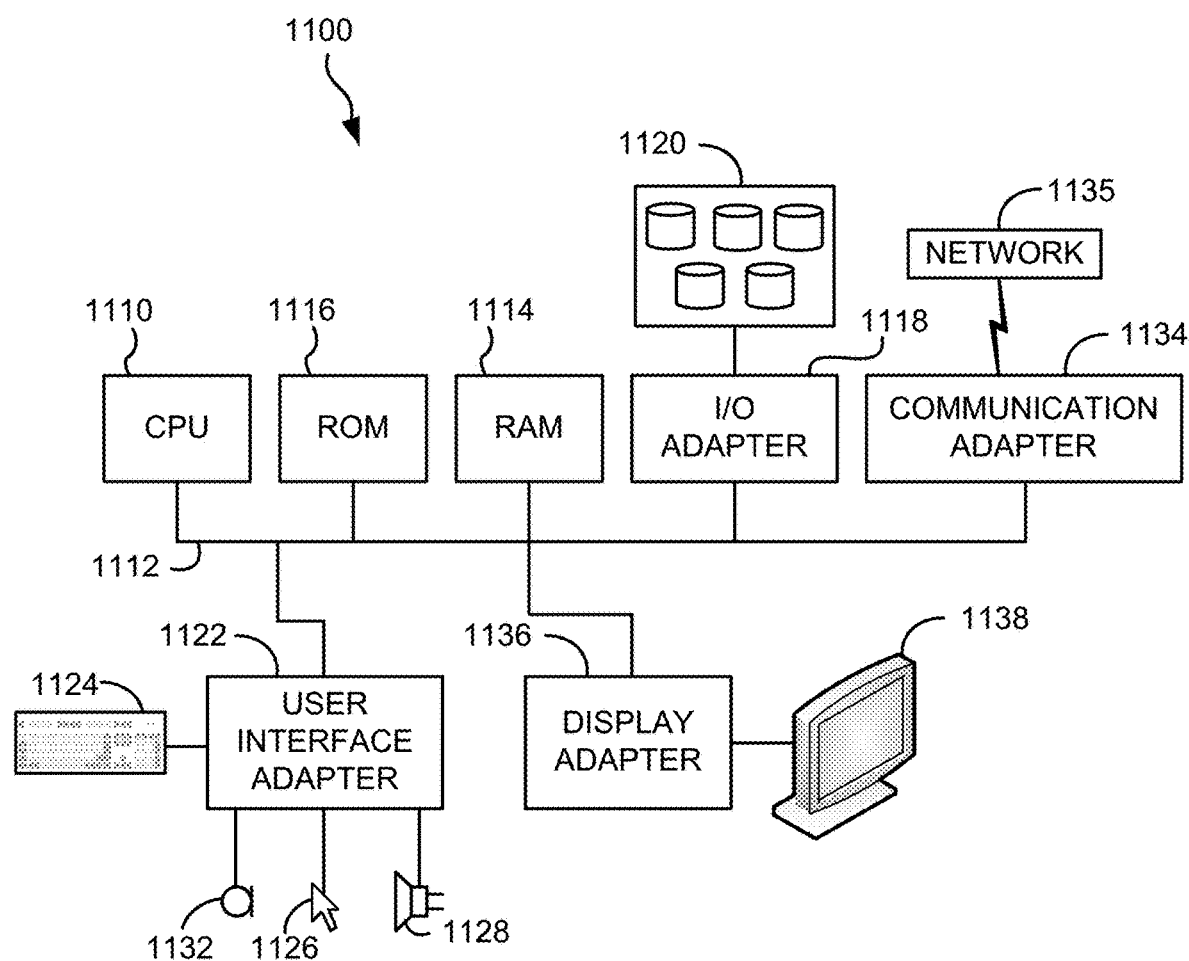
FIG. 11 is a representative hardware environment that may be associated with the servers and/or clients of FIG. 10, in accordance with one embodiment.

FIG. 11 shows a representative hardware environment associated with a user device 1016 and/or server 1014 of FIG. 10, in accordance with one embodiment. FIG. 11 illustrates a typical hardware configuration of a processor system 1100 having a central processing unit 1110, such as a microprocessor, and a number of other units interconnected via a system bus 1112, according to one embodiment. In some embodiments, central processing unit 1110 may include any of the embodiments described above with reference to the one or more processors 210 of FIG. 2.

The processor system 1100 shown in FIG. 11 includes a Random Access Memory (RAM) 1114, Read Only Memory (ROM) 1116, and an I/O adapter 1118. According to some embodiments, which are in no way intended to limit the invention, I/O adapter 1118 may include any of the embodiments described above with reference to I/O adapter 218 of FIG. 2. Referring still to processor system 1100 of FIG. 11, the aforementioned components 1114, 1116, 1118 may be used for connecting peripheral devices such as storage subsystem 1120 to the bus 1112. In some embodiments, storage subsystem 1120 may include a similar and/or the same configuration as data storage system 220 of FIG. 2. According to an example, which is in no way intended to limit the invention, storage subsystem 1120 may include non-volatile data storage cards, e.g., having Flash memory cards, RAM, ROM, and/or some other known type of non-volatile memory, in addition to RAID controllers as illustrated in FIG. 2.

With continued reference to FIG. 11, a user interface adapter 1122 for connecting a keyboard 1124, a mouse 1126, a speaker 1128, a microphone 1132, and/or other user interface devices such as a touch screen, a digital camera (not shown), etc., to the bus 1112.

Processor system 1100 further includes a communication adapter 1134 which connects the processor system 1100 to a communication network 1135 (e.g., a data processing network) and a display adapter 1136 which connects the bus 1112 to a display device 1138.

The processor system 1100 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 12:
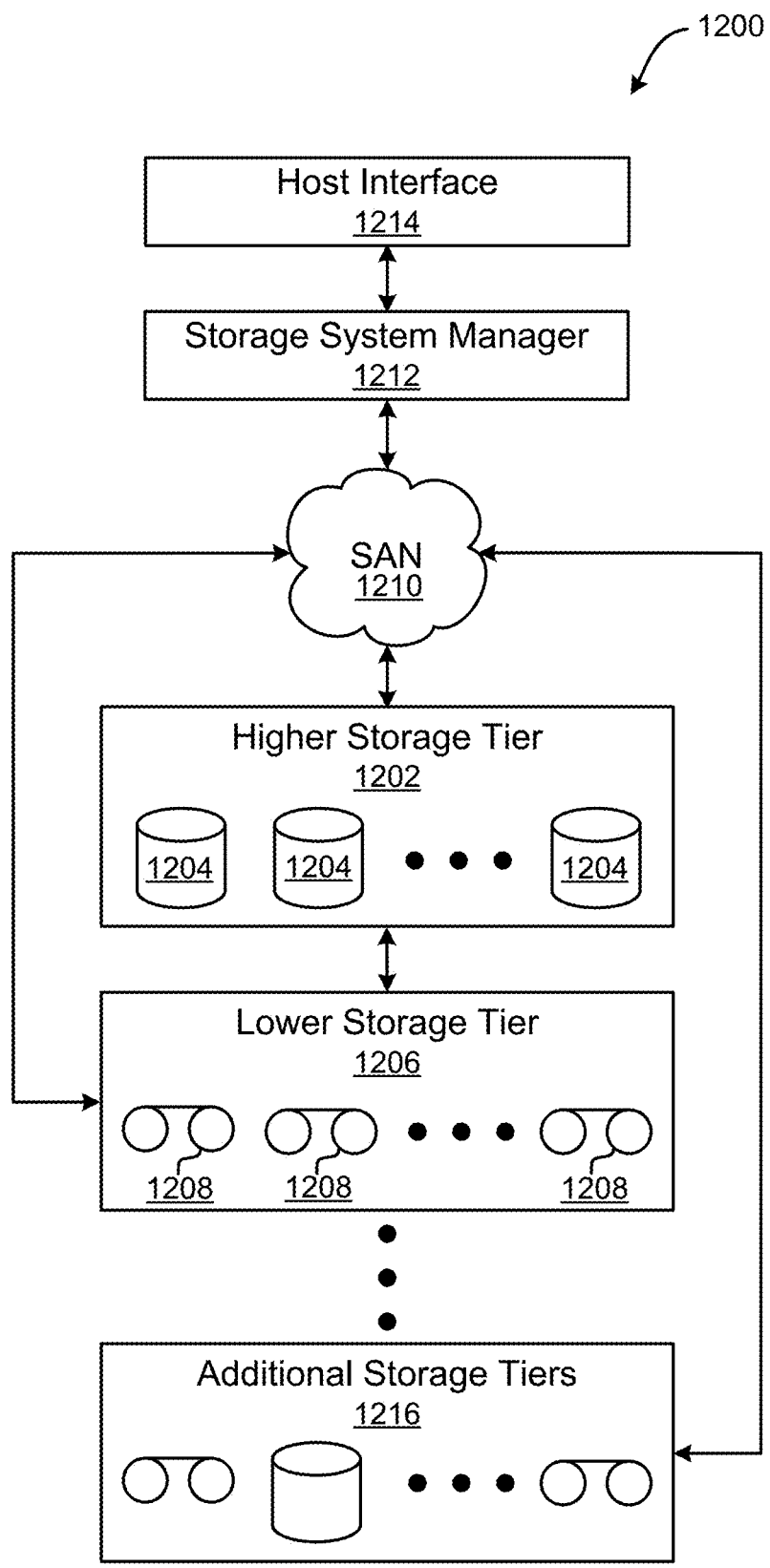
FIG. 12 is a tiered data storage system in accordance with one embodiment.

Moreover, FIG. 12 illustrates a storage system 1200 which implements high level (e.g., SSD) storage tiers in combination with lower level (e.g., magnetic tape) storage tiers, according to one embodiment. Note that some of the elements shown in FIG. 12 may be implemented as hardware and/or software, according to various embodiments. The storage system 1200 may include a storage system manager 1212 for communicating with a plurality of media on at least one higher storage tier 1202 and at least one lower storage tier 1206. However, in other embodiments, a storage system manager 1212 may communicate with a plurality of media on at least one higher storage tier 1202, but no lower storage tier. The higher storage tier(s) 1202 preferably may include one or more random access and/or direct access media 1204, such as hard disks, nonvolatile memory (NVM), solid state memory in SSDs, Flash memory, SSD arrays, Flash memory arrays, etc., and/or others noted herein or known in the art. According to illustrative examples, FIGS. 3-4 show exemplary architectures of SSD systems which may be used as a higher storage tier 1202 depending on the desired embodiment.

Referring still to FIG. 12, the lower storage tier(s) 1206 preferably includes one or more lower performing storage media 1208, including sequential access media such as magnetic tape in tape drives and/or optical media, slower accessing HDDs, slower accessing SSDs, etc., and/or others noted herein or known in the art. One or more additional storage tiers 1216 may include any combination of storage memory media as desired by a designer of the system 1200. Thus the one or more additional storage tiers 1216 may, in some embodiments, include a SSD system architecture similar or the same as those illustrated in FIGS. 1-2. Also, any of the higher storage tiers 1202 and/or the lower storage tiers 1206 may include any combination of storage devices and/or storage media.

The storage system manager 1212 may communicate with the storage media 1204, 1208 on the higher storage tier(s) 1202 and lower storage tier(s) 1206 through a network 1210, such as a storage area network (SAN), as shown in FIG. 12, or some other suitable network type. The storage system manager 1212 may also communicate with one or more host systems (not shown) through a host interface 1214, which may or may not be a part of the storage system manager 1212. The storage system manager 1212 and/or any other component of the storage system 1200 may be implemented in hardware and/or software, and may make use of a processor (not shown) for executing commands of a type known in the art, such as a central processing unit (CPU), a field programmable gate array (FPGA), an application specific integrated circuit (ASIC), etc. However, any arrangement of a storage system may be used, as will be apparent to those of skill in the art upon reading the present description.

In more embodiments, the storage system 1200 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1202, may include a majority of SSD storage media for storing data in a higher performing storage environment, and remaining storage tiers, including lower storage tier 1206 and additional storage tiers 1216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1202, while data not having one of these attributes may be stored to the additional storage tiers 1216, including lower storage tier 1206. However, one of skill in the art, upon reading the present descriptions, may devise many other combinations of storage media types to implement into different storage schemes, according to the embodiments presented herein.

According to some embodiments, the storage system (such as 1200) may include logic configured to receive a request to open a data set, logic configured to determine if the requested data set is stored to a lower storage tier 1206 of a tiered data storage system 1200 in multiple associated portions, logic configured to move each associated portion of the requested data set to a higher storage tier 1202 of the tiered data storage system 1200, and logic configured to assemble the requested data set on the higher storage tier 1202 of the tiered data storage system 1200 from the associated portions.

Of course, this logic may be implemented as a method on any device and/or system or as a computer program product, according to various embodiments.

What is claimed is:

1. A computer-implemented method, comprising:
retrieving a physical block address corresponding to a logic block address;
extracting information from the physical block address;
performing a lookup operation in cache using the extracted information;
performing a range check of the physical block address in response to the lookup operation succeeding; and
reading data from the cache in response to the range check succeeding,
wherein an architecture of the cache supports separation of data streams,
wherein the cache architecture supports parallel writes to different non-volatile memory channels,
wherein the cache architecture supports pipelining of the parallel writes to different non-volatile memory planes,
wherein the non-volatile memory controller is configured to perform a direct memory lookup in the cache based on a physical block address.

2. The computer-implemented method of claim 1, comprising:
receiving a logical block address write request;
retrieving a previous physical block address and heat value associated with the logical block address from memory;
incrementing the heat value;
computing a stream for the logic block address based on the incremented heat value;
incrementing a fill pointer of the stream;
writing data of the logic block address write request to a page indexed by the incremented fill pointer; and
retrieving an updated physical block address of the page indexed by the incremented fill pointer,
wherein writing data to the page indexed by the incremented fill pointer is delayed when the fill pointer cannot be incremented.

3. The computer-implemented method of claim 2, comprising:
updating a logical to physical table with the updated physical block address; and
invalidating the previous physical block address.

4. The computer-implemented method of claim 1, wherein the extracted information includes a type of information selected from the group consisting of: a stream, a plane, a channel and a block associated with the physical block address.

5. The computer-implemented method of claim 1, wherein performing the range check includes:
   using a valid pointer and a fill pointer of the stream to determine whether the data is located in cache; and
   determining a current write count of the cache,
   wherein reading the data from the cache is delayed when the write count exceeds a threshold value.

6. The computer-implemented method of claim 1, comprising:
   reading the data from non-volatile memory in response to the range check failing; and
   reading the data from non-volatile memory in response to the lookup operation failing.

7. The computer-implemented method as recited in claim 1, wherein the non-volatile memory includes NAND Flash memory.

8. A computer-implemented method, comprising:
   performing a direct memory lookup in cache based on a physical block address,
   wherein performing the direct memory lookup in cache includes:
      receiving a physical block address corresponding to a logic block address,
      extracting information from the physical block address, and
      performing a lookup operation in cache using the extracted information.

9. The computer-implemented method of claim 8, wherein performing the direct memory lookup in cache includes:
   performing a range check of the physical block address in response to the lookup operation succeeding;
   reading data from cache in response to the range check succeeding; and
   reading the data from non-volatile memory in response to the range check failing.

10. The computer-implemented method of claim 9, wherein the extracted information includes a type of information selected from the group consisting of: a stream, a plane, a channel and a block associated with the physical block address.

11. The computer-implemented method of claim 9, wherein performing the range check includes:
    using a valid pointer and a fill pointer of the stream to determine whether the data is located in cache; and
    determining a current write count of the cache,
    wherein reading the data from the cache is delayed when the write count exceeds a threshold value.

12. The computer-implemented method of claim 9, wherein the extracted information includes a type of information selected from the group consisting of: a stream, a plane, a channel and a block associated with the physical block address wherein performing the direct memory lookup in cache includes:
    read the data from non-volatile memory in response to the lookup operation failing.

13. The computer-implemented method of claim 9, wherein the non-volatile memory includes NAND Flash memory.

14. The computer-implemented method of claim 8, comprising:
    receiving a logic block address write request;
    retrieving a previous physical block address and heat value associated with the logical block address from memory;
    incrementing the heat value;
    computing, by the non-volatile memory controller, a stream for the logic block address based on the incremented heat value;
    incrementing a fill pointer of the stream;
    writing data of the logic block address write request to a page indexed by the incremented fill pointer; and
    retrieving an updated physical block address of the page indexed by the incremented fill pointer.

15. The computer-implemented method of claim 14, comprising:
    updating a logical to physical table with the updated physical block address; and
    invalidating the previous physical block address.

16. The computer-implemented method of claim 14, wherein writing data to the page indexed by the incremented fill pointer is delayed when the fill pointer cannot be incremented.

17. A computer program product comprising a computer readable storage medium having program instructions embodied therewith, the program instructions readable and/or executable by a controller to cause the controller to:
    perform, by the controller, a direct memory lookup in cache based on a physical block address,
    wherein performing the direct memory lookup in cache includes:
       receiving a physical block address corresponding to a logic block address,
       extracting information from the physical block address, and
       performing a lookup operation in cache using the extracted information.

18. The computer program product of claim 17, wherein performing the direct memory lookup in cache includes:
    performing a range check of the physical block address in response to the lookup operation succeeding;
    reading data from cache in response to the range check succeeding; and
    reading the data from non-volatile memory in response to the range check failing.

19. The computer program product of claim 18, wherein the extracted information includes a type of information selected from the group consisting of: a stream, a plane, a channel and a block associated with the physical block address.

20. The computer program product of claim 18, wherein performing the range check includes:
    using a valid pointer and a fill pointer of the stream to determine whether the data is located in cache; and
    determining a current write count of the cache,
    wherein reading the data from the cache is delayed when the write count exceeds a threshold value.

* * * * *